Oct. 28, 1930.  K. R. EAMES  1,779,666
MACHINE FOR SEVERING TALLY MARKS FROM WOOL
Filed March 5, 1929  5 Sheets-Sheet 1

Inventor
Kenneth R. Eames
By Attorneys
Southgate Hayes Hawley

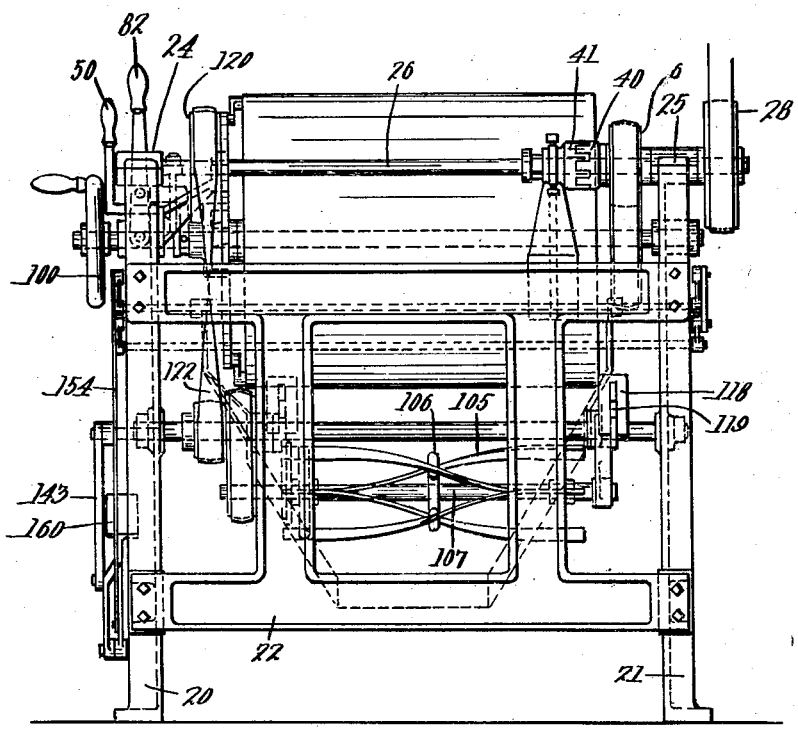

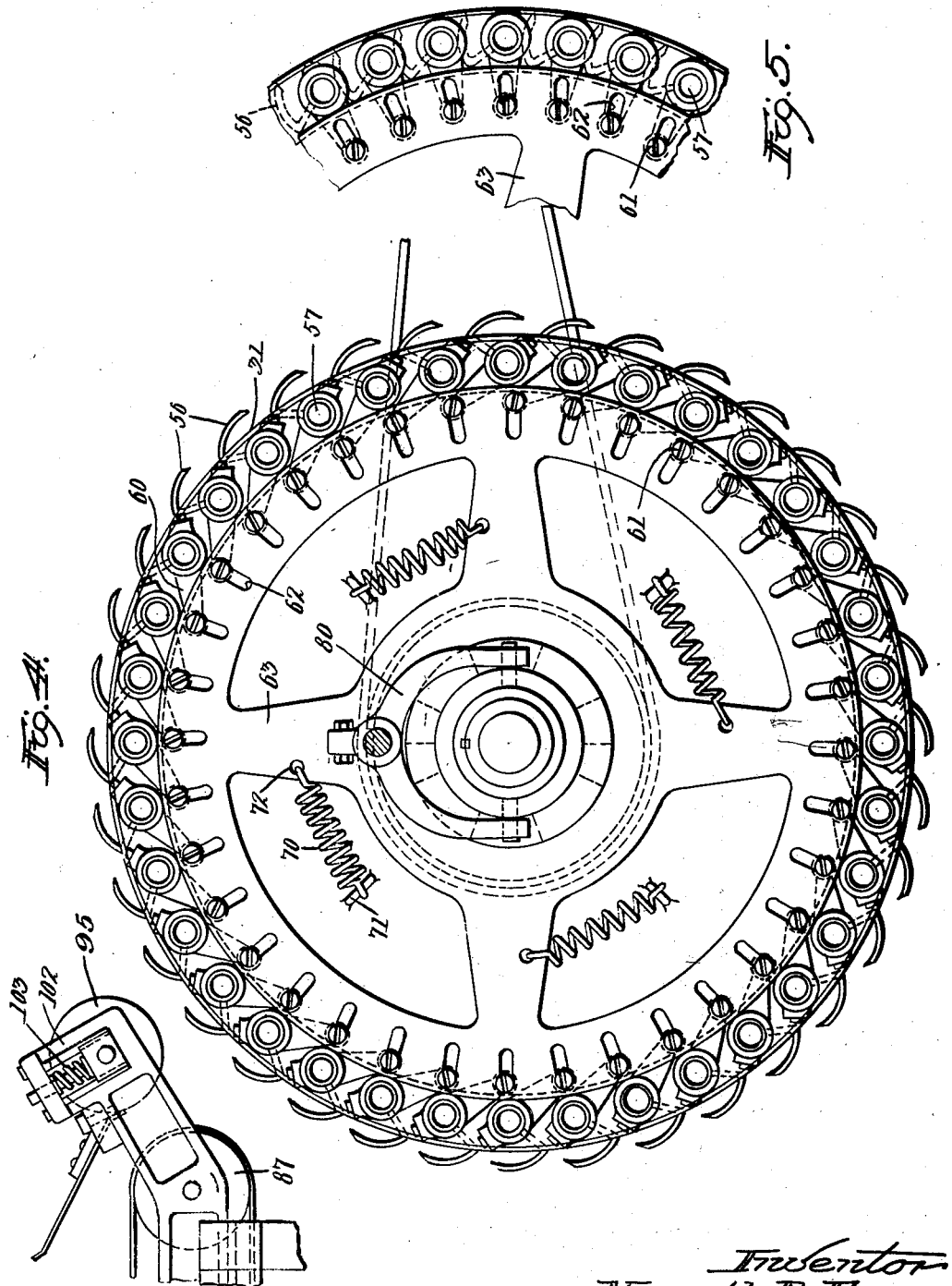

Oct. 28, 1930.　　　　K. R. EAMES　　　　1,779,666
MACHINE FOR SEVERING TALLY MARKS FROM WOOL
Filed March 5, 1929　　　5 Sheets-Sheet 4
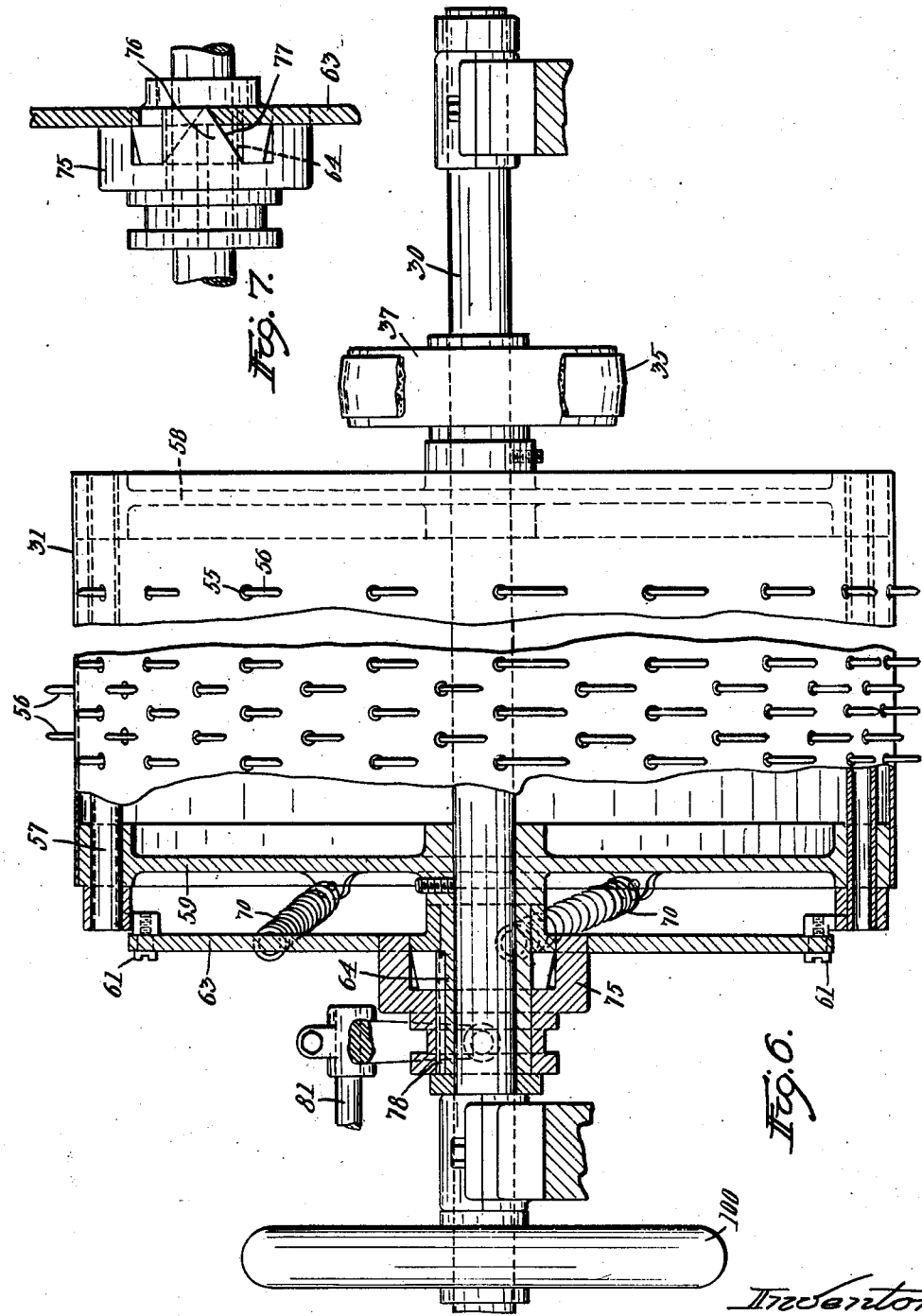

Patented Oct. 28, 1930

1,779,666

UNITED STATES PATENT OFFICE

KENNETH R. EAMES, OF WORCESTER, MASSACHUSETTS, ASSIGNOR OF ONE-HALF TO WILLIAM A. MILLER, OF CONIMICUT, RHODE ISLAND

MACHINE FOR SEVERING TALLY MARKS FROM WOOL

Application filed March 5, 1929. Serial No. 344,567.

This invention relates to a method of and machine for clipping or shearing marks of paint, tar or other similar material from wool.

It is customary in sheep raising or on sheep ranches to place on the sheep identifying marks or brands for the purpose of keeping the count or tally of the sheep or for indicating ownership thereof. This is usually done by daubing the sheep with paint or tar.

When a sheep thus branded or marked is sheared, the wool carries with it the dried and hardened tar or paint daubs or marks and it is a laborious task to sort out and clip or cut away the daubed or marked parts of the wool. Furthermore, unless great care is exercised, portions of the wool that are not so marked will also be clipped off, thus causing a further waste.

This invention has for its salient object to provide a simple, practical and economical method and apparatus or device for clipping or cutting marked or daubed portions from wool.

Further objects of the invention will appear from the following specification taken in connection with the drawings which form a part of this application and in which Fig. 1 is a side elevation of the machine constructed in accordance with this invention;

Fig. 3 is a rear elevation of the machine shown in Fig. 1;

Fig. 4 is an enlarged elevational view, partly broken away, showing the feeding drum and parts associated therewith;

Fig. 5 is a fragmentary elevation, showing the wool gripping or clamping hooks retracted within the drum;

Fig. 6 is an elevational view, partly in section, taken at right angles to Fig. 4;

Fig. 7 is a detail sectional elevation, showing the mechanism for controlling the projection or retraction of the gripping or clamping hooks.

Figures 1, 2:
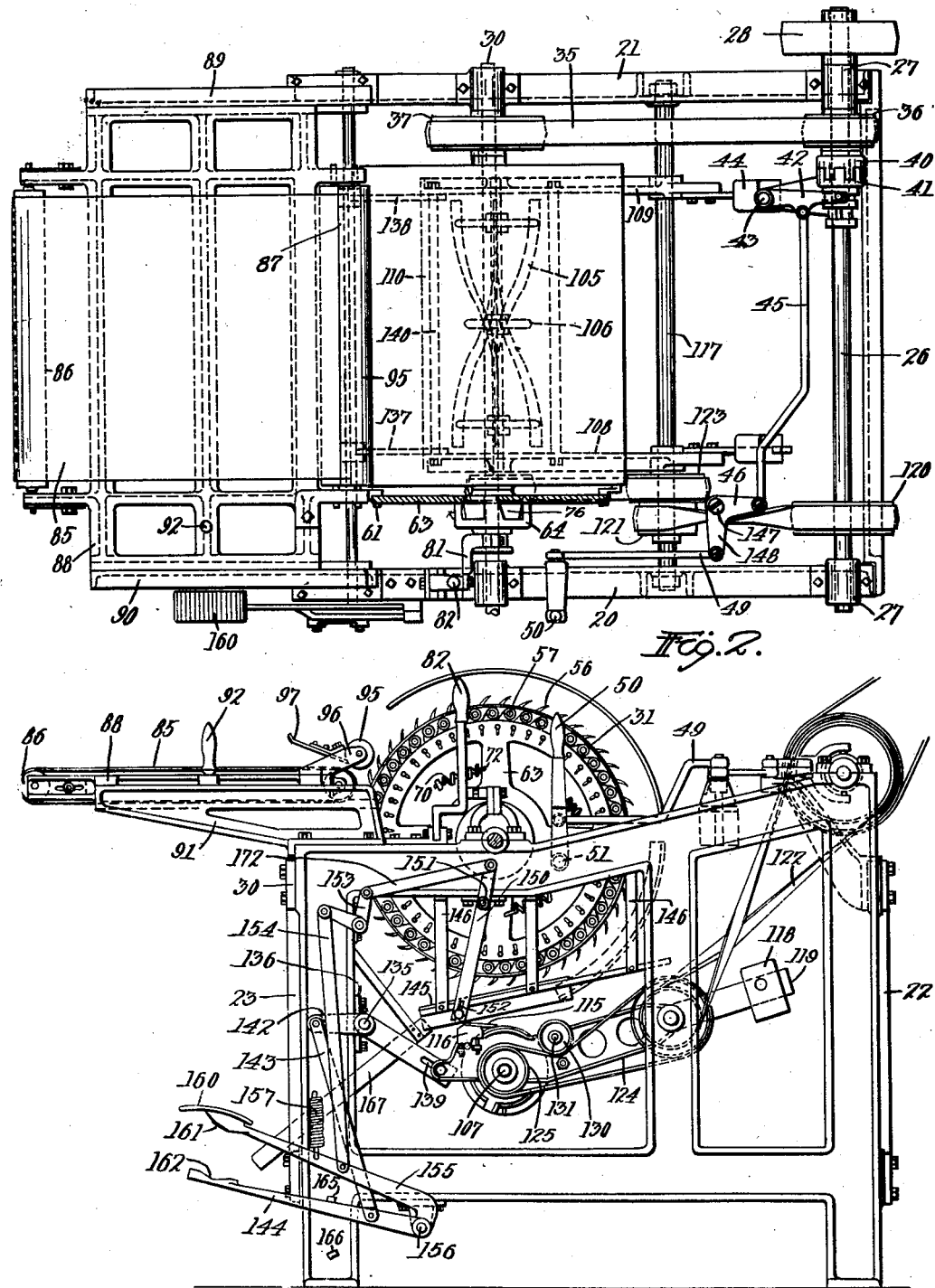
Fig. 2 is a top plan view of the structure shown in Fig. 1.
Figure 8:
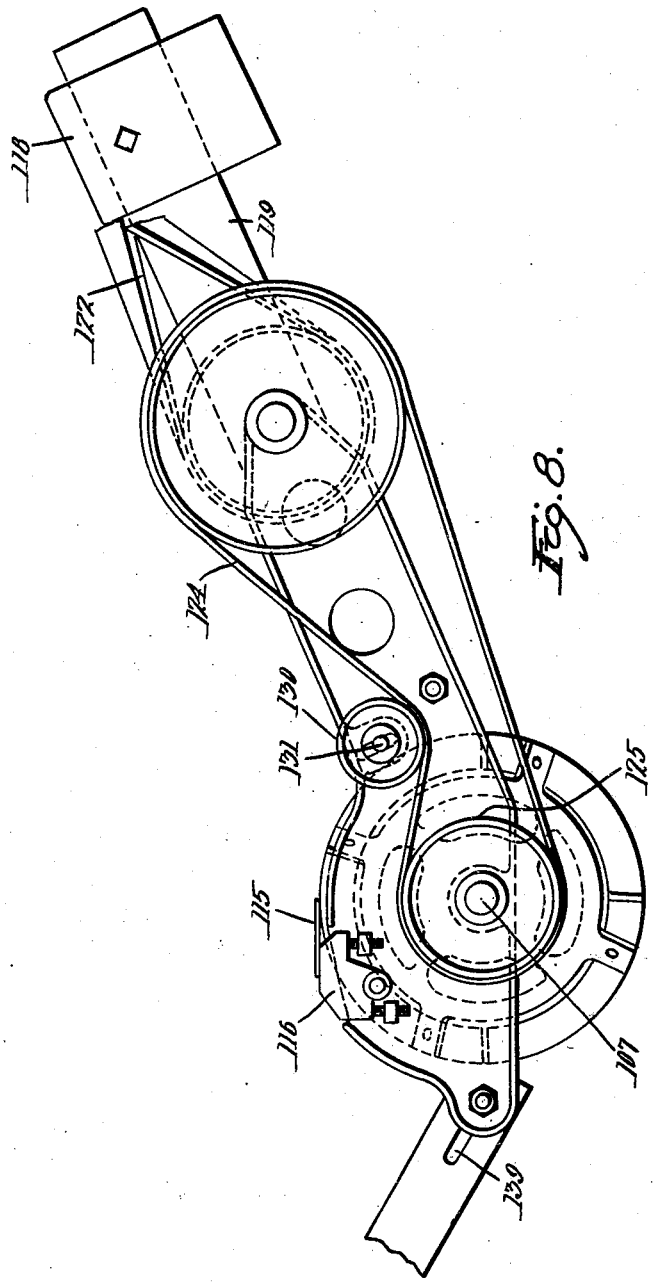
Fig. 8 is an elevational view, showing the clipping or cutting mechanism.

The invention briefly described, consists of a method of clipping or shearing marked or branded portions from sorted wool. In carrying out the method, the marked portions are caused to be thrown out by centrifugal force into the path of cutting or shearing means. In this way the marked or daubed portions of the wool are severed from the remaining portion.

The apparatus for carrying out the method, consists of a rotary drum having means thereon for gripping or clamping the wool, and cutting means adapted to be positioned adjacent the periphery of the drum and to severe or cut from the gripped portions of the wool the portions thereof having thereon the daubs or marks. Further details of the invention will appear as the description proceeds.

*Wool gripping and rotating mechanism*

In the particular form of apparatus illustrated in the drawings, there is shown a machine comprising side frames 20 and 21 connected by cross frames 22 and 23. The side frames 20 and 21 have longitudinal extending frame members 24 and 25 at the upper ends thereof and a drive shaft 26 is mounted in bearings 27 carried by the frame members 24 and 25. The shaft 26 may be driven in any suitable manner and as shown has secured thereto a drive pulley 28 which may be connected to any suitable source of power.

A second shaft 30 is also mounted in bearings on the frame members 24 and 25 and a drum 31 is secured to and is rotatable with the shaft 30.

The shaft 30 is driven by a belt 35 which receives power from a pulley 36 loosely mounted on the shaft 26 and extends around a pulley 37 mounted on and fixed to the shaft 30.

The rotation of the pulley 36 is governed or controlled by means of a clutch comprising a pair of clutch members 40 and 41 mounted on the shaft 26. The clutch member 41 is keyed to the shaft 26 and is slidable thereon, being controlled by a yoke 42 which is pivoted at 43 to a bracket 44. The yoke 42 is connected by a link 45 to a bell crank lever 46 mounted on a fixed pivot 47 and having its opposite arm 48 connected by a link 49 to a lever 50 mounted on a fixed pivot 51 carried by the frame member 24.

From the foregoing description, it will be clear that as the lever 50 is swung to the left (viewed in Fig. 1), the clutch members 41, 40 will be allowed out of co-acting relation with respect to each other, thus disconnecting the pulley 36 from the drive shaft 26. As the lever 50 is moved in the opposite direction, the clutch will be thrown in.

The drum 31 has formed in its periphery a plurality of apertures 55 through which are adapted to project hooks 56. The hooks 56 are carried by sleeves or shafts 57 which are rotatably mounted in the ends or heads 58 and 59 of the drum 31. The sleeves, as shown in Fig. 6, are positioned within the drum periphery. Each sleeve or shaft 57 extends at one end through the head 59 and has secured to its outer end an arm 60 having projecting laterally from the end thereof a stud 61. Each of the studs 61 extends into a radial slot 62 formed in a plate 63 rotatably mounted on a hub 64 formed on the head 59. As the plate is rotated from the position shown in Fig. 4 to the position shown in Fig. 5, the shafts or sleeves 57 will also be rotated by reason of the engagement of the stud 61 in the slot 62. Thus the hooks 56 will be retracted through the apertures 55.

The rotation of the plate 63 with respect to the drum is controlled in the following manner:— A plurality of springs 70 are secured at one end 71 to the head 59 and at the other end 72 to the plate 63. Thus when the plate is free to move, the springs will move the plate to the position shown in Fig. 4, in which position the hooks are projected through the apertures 55. When the hooks are in this position, the wool can be fed to the drum in a manner hereinafter described and will be gripped or clamped by the hooks as the drum is rotated.

The retraction of the hooks is controlled by means of a cam member 75 which is slidably mounted on the hub 64. The member 75 has formed thereon a plurality of cam surfaces 76 and as the member is moved to the right in Figs. 6 and 7, the cam surfaces coact with inclined cam surfaces 77 formed in the plate 63 to cause the plate to rotate on the hub 64 and relative to the head 59. The cam member 75 is keyed, as shown at 78, to the hub 64.

The axial movement of the cam 75 is controlled by a clutch yoke 80. The yoke 80 has secured to its upper end a rod 81, which in turn is connected to a lever 82 mounted on the frame member 24. As the lever 82 is swung on its pivot toward the drum 31, the cam surfaces 76 will co-act with corresponding surfaces on the plate 77 to cause the plate to be rotated on its axis, thus moving the plate from a position such as that shown in Fig. 4 to the position shown in Fig. 5. This rotation of the plate will also cause the sleeves or shafts 57 to be rotated on their axes and will cause the hooks 56 to be retracted within the drum 31.

*Wool feeding mechanism*

Any suitable feeding mechanism may be provided for feeding the wool to the drum, but in the form of the invention shown, there is illustrated an endless belt 85 mounted on rollers 86 and 87 carried by a frame 88, which is slidably mounted in guideways 89 and 90 formed in an extension frame 91 secured to and projecting in front of the main frame of the machine. A handle 92 is secured to the frame 88 and facilitates the movement of the frame toward and away from the drum.

An idler roller 95 is mounted in brackets 96 secured to and projecting toward the drum from the frame 88. A guide-plate 97 is also secured to the brackets and guides the wool to a position between the idler roller 95 and the endless feeding belt 85.

In order to facilitate the manual rotation of the drum 31 during the feeding of the wool thereto, a hand wheel 100 is secured to one end of the shaft 30.

In order to load the machine, the wool is placed on the belt 85 and the frame 88 is moved toward the drum. The belt 85 is then fed manually with the wool and the wool passes between the belt and the idler roller 95 to the hooks 56. The drum 31 is then rotated slowly by means of the hand wheel 100 until the hooks around the periphery of the drum have been loaded with the wool. This operation is clearly shown in Fig. 4. In this figure, it will be seen that the idler roller 95 is slidably mounted in the ends 102 of the brackets 96 and is spring-pressed downwardly by springs 103.

*Cutting mechanism*

In the particular form of the invention illustrated, the cutting mechanism consists of a plurality of spiral cutting blades 105 carried by spiders 106 mounted on a shaft 107. The shaft 107 is carried by a frame comprising side frame members 108 and 109 and suitable cross frame members 110.

The spiral blades 105 co-act in a cutting function with a ledger plate 115, which is adjustably mounted, as shown at 116 on the frame members 108 and 109.

The frame of the cutting mechanism is pivoted on the shaft 117, which is mounted at its ends in the side frame members of the main frame of the machine. The frame of the cutting mechanism is counterbalanced by means of weights 118, which are adjustably mounted on extensions 119 formed on the frame members 108 and 109 and disposed on opposite side of the shaft 117 from the frame members 108 and 109.

The cutting mechanism is driven by the following operative driving connections:—A pulley 120 is secured to the shaft 26 and is connected to a pulley 121 rotatably mounted on the shaft 117, by means of a belt 122. The pulley 121 is operatively connected to drive a pulley 123, which in turn is connected by a belt 124 to drive a pulley 125 mounted on the cutter shaft 107. The belt 124 passes beneath an idler pulley 130 mounted on the stud 131 carried by the frame member 108.

The cutter frame, as above stated, is pivotally mounted to swing on the shaft 117 and the position of this frame is controlled in the following manner:—A shaft 135 is mounted in brackets 136 secured to the frame of the machine and has secured thereto arms 137 and 138 having slots 139 at their free ends. The slots 139 receive a cross rod 140, which extends between the front ends of the frame members 108 and 109.

The shaft 135 extends through the side frame 20 of the machine and has secured to its outer end an arm 142, which is connected by a link 143 to a foot treadle 144 operated in a manner hereinafter set forth.

Cutter guard

In order to prevent the wool carried by the hooks from accidentally dropping on the cutting mechanism prior to the clipping thereof and also in order to guide the wool out of the machine it is released by the hooks, there is provided a catch-pan or shelf 145 disposed beneath the drum The pan 145 is mounted on arms 146 secured to the frame of the machine The position of the pan is controlled by a lever 150 pivoted at 151 to the machine frame and connected by a pin and slot connection, as shown at 152 to the frame of the pan 145. The lever 150 is connected at its upper end by a link 172 to a bell crank lever 153, which in turn is connected by a link 154 to a foot treadle 155 mounted on a pivot 156. The foot treadle 155 is normally held in elevated position by means of a spring 157. At its outer end, the treadle 155 has formed thereon a tread 160 and a downwardly extending projection 161, which is adapted to engage a projection or tread 162 formed on the free end of the foot treadle 144.

When the foot treadle 155 is depressed, the pan 145 will slide out from beneath the drum 31 and as the projection 161 on the treadle 155 engages the outer end 162 of the treadle 144, the latter treadle will also be depressed, thus causing the cutting mechanism to be moved upwardly to operative position with respect to the drum. As the drum is rotated, the portions of the wool having the daubs of paint or tar thereon will be swung outwardly by centrifugal force and the cutting mechanism will be raised to a position to engage and sever the marked or daubed portions from the wool.

The upper and lower limits of movement of the treadle 144 are determined by stops 165 and 166. A shelf or trough 167 is provided to guide the wool from the machine after the wool has been released from the hooks 56.

Operation

The operation of the machine may be briefly described as follows: The hooks 56 are first projected through the apertures and drum 31 by the springs 70, it being understood that the lever 82 is so positioned as to permit the springs to cause the projection of the hooks through the drum. The clutch 40, 41 between the shaft 26 and the pulley 36 is thrown out. After the frame 88 has been moved forwardly toward the drum, the wool which has been distributed on the conveyor belt 85 is then fed to the drum. This feeding is accomplished by manually causing the belt 85 to feed the wool between the belt and the idler roller 95. During this operation, the drum is rotated by the hand wheel 100.

After the drum has been loaded, the clutch 40, 41 will be thrown in and the operator will step on the tread 160, thus withdrawing the pan 145 from beneath the drum and subsequently raising the cutting mechanism to operative position. As the drum is thus rapidly rotated, the heavier portions of the wool having the daubs of paint or tar thereon will be thrown outwardly by centrifugal force and the cutting mechanism will be so positioned as to engage and cut these marked or daubed portions. After this cutting operation has been carried out, the cutting mechanism will be again lowered to inoperative position and the pan 145 will again be positioned beneath the drum. Thereupon, the lever 82 will be actuated to cause the cam member 75 to rotate the disc 63 from the position shown in Fig. 4 to the position shown in Fig. 5. This rotation of the disc will cause the hooks to be retracted, thus releasing the wool which will drop on the pan 145 and will be fed from the machine through the trough 167.

Although one specific embodiment of the invention and one particular form of apparatus for carrying out the method has been particularly shown and described, it will be understood that the invention is capable of modification and that changes in the construction and in the arrangements of the various parts of the apparatus may be made without departing from the spirit or scope of the invention as expressed in the following claims:—

I claim:

1. The method of removing marked or branded portions from wool which consists in providing severing means, and in revolving portions of wool adjacent thereto at a speed effective to cause the marked wool to be thrown outward by centrifugal force beyond the unmarked wool associated therewith and into the path of said severing means.

2. The method of removing marked or branded portions from wool which consists in providing severing means, and in gripping portions of wool and revolving the gripped wool, adjacent said severing means at a speed effective to cause the marked portions to be thrown outward by centrifugal and rotary forces into the path of said severing means.

3. In a machine for removing marks from wool, in combination, a drum, a plurality of wool holding devices thereon adapted to hold bunches of loose wool on said drum, means for rotating the drum, and severing means disposed adjacent to but spaced from the periphery of said drum, said drum being rotated at a speed effective to cause the marked wool to be thrown outward by centrifugal force into the path of said severing means.

4. In a machine for removing marks from wool, in combination, a drum, a plurality of wool-holding devices thereon adapted to hold bunches of loose wool on said drum, means for feeding wool to said holding means, means for rotating the drum, and severing means disposed adjacent to but spaced from the periphery of said drum, said drum being rotated at a speed effective to cause the marked wool to be thrown outward by centrifugal force into the path of said severing means.

5. In a machine for removing marks from wool, in combination, a drum, a plurality of wool piercing and holding devices thereon, adapted to pierce and hold bunches of loose wool on said drum, means for rotating the drum, and cutting means disposed adjacent to but spaced from the periphery of said drum, said drum being rotated at a speed effective to cause the marked wool to be thrown outward by centrifugal force into the path of said cutting means.

6. In a machine for removing marks from wool, in combination, a drum, a plurality of wool piercing and holding devices thereon adapted to pierce and hold bunches of loose wool, means for projecting and retracting said devices, means for rotating the drum, and severing means disposed adjacent to but spaced from the periphery of said drum, said drum being rotated at a speed effective to cause the marked wool to be thrown outward by centrifugal force into the path of said severing means.

7. In a machine for removing marks from wool, in combination, a drum, a plurality of wool-holding devices thereon adapted to hold bunches of loose wool on said drum, means for rotating the drum, cutting means disposed adjacent to but spaced from the periphery of said drum, and means to adjust the operative position of said cutting means toward and from said drum, said drum being rotated at a speed effective to cause the marked wool to be thrown outward by centrifugal force into the path of said cutting means.

8. In a machine for removing marks from wool, in combination, a drum, a plurality of wool-holding devices thereon adapted to be projected from said drum to grip bunches of loose wool, means for rotating the drum, cutting means disposed adjacent to but spaced from the periphery of said drum, and means for moving said cutting means to operative and inperative positions relative to the path of movement of the material carried by said wool-holding devices, said drum being rotated at a speed effective to cause the marked wool to be thrown outward by centrifugal force into the path of said cutting means when in operative position.

9. In a machine for removing marks from wool, in combination, a drum, wool-holding means carried thereby, means for feeding loose wool to said holding means, means for slowly and manually rotating said drum during said feeding operation, power operated driving connections for rapidly rotating said drum, and cutting mechanism movable into the path of movement of the wool held by said holding means while the drum is rotated at high speed, said drum when rotating at high speed being effective to cause the marked wool to be thrown outward by centrifugal force into the path of said cutting mechanism.

10. In a machine for removing marks from wool, in combination, a plurality of sets of devices adapted to pierce and hold bunches of loose wool, means for moving said devices in a circular path at high speed, and a cutting device movable toward and away from the path of movement of said piercing and holding devices, said piercing and holding devices when rotating at high speed being effective to cause the marked wool to be thrown outward by centrifugal force into the path of said cutting device.

11. In a machine for removing marks from wool, in combination, a plurality of sets of devices adapted to pierce and hold bunches of loose wool, means for rotating said devices at high and low speeds around a common axis, and a cutting device movable toward and away from the path of movement of said piercing and holding devices, said piercing and holding devices when rotating at high speed being effective to cause the marked wool to be thrown outward by centrifugal force into the path of said cutting device.

12. In a machine for removing marks from wool, in combination, a plurality of sets of hooks adapted to pierce and hold bunches of loose wool, means for rotating said hooks at high speed around a common axis, and a severing device movable toward and away from the piercing and holding hooks and positioned adjacent said hooks while they are in rapid rotation, the high speed of said hooks being effective to cause the marked wool to be thrown outward by centrifugal force into the path of said severing device.

13. In a machine for removing marks from wool, in combination, a drum, wool-holding means carried thereby, means for feeding loose wool to said holding means, means for slowly rotating said drum during said feeding operation, clutch controlled, power operated driving connections for rotating said drum at high speed, and cutting mechanism movable into the path of movement of the wool engaged by said holding means as the drum is rotated, said drum when rotating at high speed being effective to cause the marked wool to be thrown outward by centrifugal force into the path of said cutting mechanism.

14. In a machine for removing marks from wool, in combination, a drum, means for rotating said drum, wool-holding means carried by said drum, a cutter guard mounted below the drum, a cutter below the guard, and means operable to successively move the guard out from beneath the drum and move the cutter toward the drum, said drum being rotated at a speed effective to cause the marked wool to be thrown outward by centrifugal force into the path of said cutting means.

15. In a machine for removing marks from wool, in combination, wool-holding devices, means for moving said devices through a predetermined path of movement, a cutter guard disposed below said path of movement of the holding devices, a cutter mounted below said holding devices, and means operable to successively remove said guard from beneath the path of movement of said devices and to move said cutter toward said path of movement, said devices being moved at a speed effective to cause the marked wool to be thrown outward by centrifugal force into the path of said cutter.

16. In a machine for removing marks from wool, in combination, a rotary member, wool-holding means thereon, manually operable means for feeding loose wool to said holding means, manually operable means for slowly rotating said rotary member, power operated driving connections for rapidly rotating said member, a cutter mounted adjacent said rotary member and movable toward or away from said member, and driving connections for the cutter adapted to drive the cutter in any position thereof, said member when rotating at high speed being effective to cause the marked wool to be thrown outward by centrifugal force into the path of said cutter.

17. In a machine for removing marks from wool, in combination, a rotary member, wool-holding means thereon, manually operable means for feeding loose wool to said holding means, manually operable means for slowly rotating said member, clutch controlled power operated driving connections for driving said member, a cutter mounted adjacent said rotary member and movable toward or away from said member, manual means to move said cutter relative to said rotary member, and driving connections for the cutter adapted to drive the cutter in any position thereof, said member when rotating at high speed being effective to cause the marked wool to be thrown outward by centrifugal force into the path of said cutter.

In testimony whereof I have hereunto affixed my signature.

KENNETH R. EAMES.